United States Patent [19]

Stanley et al.

[11] Patent Number: 4,628,663

[45] Date of Patent: Dec. 16, 1986

[54] CLIP PUNCH DEVICE AND PACKAGING APPARATUS EQUIPPED THEREWITH

[75] Inventors: Thomas R. Stanley, Downers Grove; David L. Wright, Oakwood, both of Ill.

[73] Assignee: Teepak, Inc., Oak Brook, Ill.

[21] Appl. No.: 571,968

[22] Filed: Jan. 18, 1984

[51] Int. Cl.[4] .......................................... B65B 51/05
[52] U.S. Cl. .............................. 53/138 A; 92/13.41; 92/13.6; 411/317
[58] Field of Search ............... 53/138 A; 29/243.57; 92/13.4, 13.41, 13.6; 411/217, 221, 315, 316, 317, 109, 128, 178

[56] References Cited

U.S. PATENT DOCUMENTS

| | | | |
|---|---|---|---|
| 674,115 | 5/1901 | Heilrath | 411/221 X |
| 727,152 | 5/1903 | Kimball | 411/317 |
| 738,546 | 9/1903 | Keller | 92/13.4 |
| 955,902 | 4/1910 | Rand | 411/217 X |
| 971,451 | 9/1910 | Le Blanc | 411/295 X |
| 2,392,701 | 1/1946 | Sanders | 411/294 |
| 2,804,360 | 8/1957 | Smith | 309/2 |
| 2,881,738 | 4/1959 | Baker | 121/13 |
| 2,995,113 | 8/1961 | Steiner | 121/13 |
| 3,232,182 | 2/1966 | Gilbert | 92/13.41 |
| 3,237,290 | 3/1966 | Frank | 29/243.57 |
| 3,282,049 | 11/1966 | Benton | 60/52 |
| 3,497,111 | 2/1970 | Savage | 92/13.6 |
| 3,583,056 | 6/1971 | Klenz | 29/243.57 |
| 3,717,972 | 2/1973 | Niedecker | 53/138 A |
| 3,919,739 | 11/1975 | Kawai | 17/33 |
| 3,973,472 | 8/1976 | Russell, Jr. | 92/13.6 |
| 4,100,716 | 7/1978 | Barroso | 53/138 A |
| 4,114,250 | 9/1978 | Dent | 411/221 X |

FOREIGN PATENT DOCUMENTS

| | | | |
|---|---|---|---|
| 2410332 | 9/1975 | Fed. Rep. of Germany | 53/138 A |
| 2711430 | 9/1978 | Fed. Rep. of Germany | 53/138 A |
| 996765 | 6/1965 | United Kingdom | 53/138 A |
| 770459 | 10/1980 | U.S.S.R. | |

Primary Examiner—John Sipos
Attorney, Agent, or Firm—Howard M. Ellis; Michael L. Dunn

[57] ABSTRACT

A clip punch device for banding encased meat products comprising a positive locking piston stop accurately controls the length of downstroke of the punch rod substantially reduces or eliminates overforming and underforming of closure clips and potential for leakage of packaged product.

17 Claims, 5 Drawing Figures

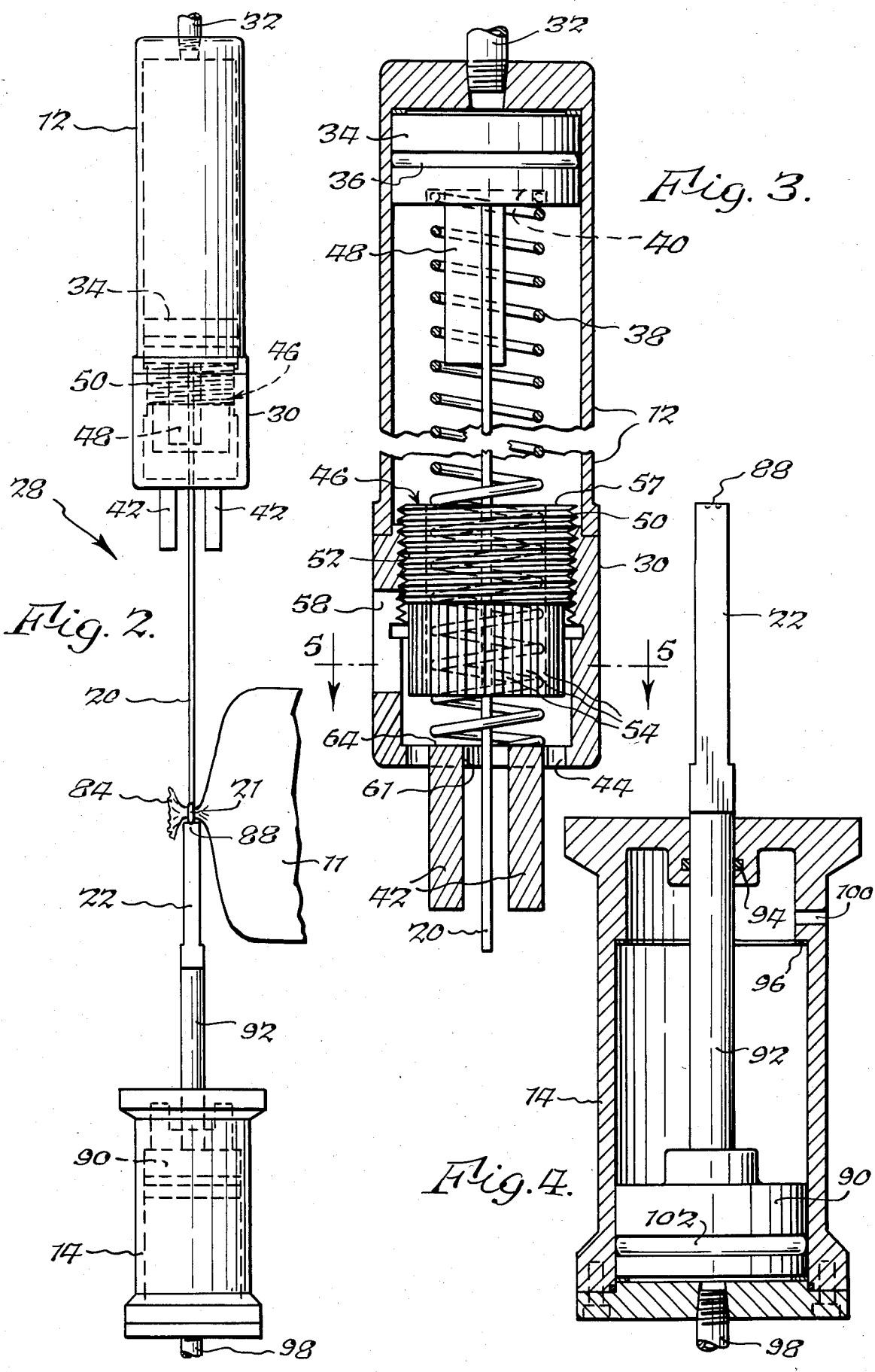

CLIP PUNCH DEVICE AND PACKAGING APPARATUS EQUIPPED THEREWITH

BACKGROUND OF THE INVENTION

The present invention relates to devices for closing packaged products. More particularly, this invention relates to improved devices for sealing casings filled with foodstuffs, especially meat products like bolognas, salamis, hams, etc., so as to substantially reduce or eliminate leakage resulting from improperly installed metal fasteners or clips placed at the terminal ends of the filled casings.

In the preparation of sausages, sausage paste or emulsion is formed of comminuted meat, together with fillers, seasonings, spices, etc., and is used to fill sausage casings. The sausage emulsion is introduced through a stuffing horn into the casing. In the case of small sausages, the casing which is filled with sausage emulsion is twisted, tied or clipped and thus formed into suitable links at predetermined intervals and subsequently processed. In the case of large sausages, such as bolognas, salamis, and the like, the sausage meat emulsion is introduced into a large, heavy-walled casing with the end closed, and is formed into a single large link or stick of sausage. The casing filled with the sausage meat may be subjected to cooking, smoking, etc., or in some cases, may be supplied to the customer without additional processing. Small sausages of the frankfurter, knockwurst or vienna type are generally smoked and cooked and the casing removed prior to marketing.

As previously indicated, in preparation of large diameter sausages a casing is first placed on a stuffing horn of an automatic meat stuffing apparatus, meat emulsion extruded through the horn and the ends of the casing are closed. Automatic meat stuffing apparatus used in such filling operations frequently employ tying or clip punch devices to form end closures on filled meat and sausage casings. Representative examples of automatic meat stuffing apparatus include those described in U.S. Pat. No. 3,919,739, such as the model FUT-70 by the Futaba Corporation. Other sausage machines utilizing clip punch devices are described in U.S. Pat. Nos. 3,553,768 and 3,237,290.

Typically, as part of the sausage packaging process a filled casing is clamped at each end by a shutter mechanism and metal clips or fasteners automatically banded to the terminal ends of the casing to form secure end closures. However, the banding process, in some instances, can result in puncturing or tearing the casing material by overforming the metal clips resulting in a loss of product, juices, etc. Likewise, underforming casing clips can also produce similar results whereby product is lost due to clips being applied too loosely. In many instances, such results can be attributed to the clip punch per se. That is, when such a device is even slightly out of adjustment defective banding of casings during meat filling operations can occur. Seemingly, minor differences in manufacture and wear on parts can cause clips to form differently from location to location. In addition, clip punch devices used in sealing filled meat casings have lacked convenient and dependable means for adjusting the length of stroke to compensate for variances, such as casing thicknesses and clip sizes. Consequently, too often the length of the downward stroke of the device is incorrect for a given application.

One example of a clip punch is described in U.S. Pat. No. 3,583,056. This particular punch has an adjustable down stroke, however, the length of the down stroke is controlled by a combination of an external shaft and a turning nut affixed to the top of a piston. The turning nut lacks a positive locking mechanism, and consequently, more frequent adjustments could be required. Accordingly, there is a need for an improved clip punch device which will provide a flexible and dependable means for adjusting the length of stroke of the device for variances in casing and clip sizes while avoiding overforming and underforming said clips during the banding process. In addition, once the length of stroke has been adjusted it should remain fixed and not be subject to loosening requiring further adjustments.

SUMMARY OF THE INVENTION

The present invention provides for a novel clip punch device which has a convenient means for controlling and maintaining the length of stroke of the piston and striker rod of said punch. The improved clip punch assures the formation of a secure end-closure on a filled casing without leakage of packaged meat or damage to the casing. The present invention also contemplates the application of the improved clip punch devices as integral components of modern automated meat stuffing and sausage filling equipment. However, it is to be understood the concepts embodied herein are also applicable to other applications where the downward stroke of a piston must be carefully regulated. Accordingly, the present invention has wider application than merely food packaging equipment where, for instance, various U-shaped clips and staples, including butt-type clips, cross over clips, to name but a few, are used. Accordingly, the novel clip punch device and positive locking piston stop described in greater detail below are adaptable to a variety of applications which call for flexible means for controlling and positively maintaining the length of stroke of a piston in generating and transferring energy.

Generally, the clip punch device of the present invention is a fluid actuated device comprising a cylinder, a cylinder base mounted axially to the cylinder wherein said base has an interior threaded sidewall. The device includes a piston which traverses the cylinder and a downward extending striker or punch rod affixed to the piston for compressing the clip. A die of appropriate design may be positioned below the striker rod against which the clip is deformed. The length of the downward stroke of the piston is controlled by means of a piston stop which comprises a continuous sidewall defining a cylindrically-shaped tubular body having interior and exterior surfaces and a central opening. At least a portion of the exterior surface of the sidewall of the piston stop is threaded for mating with the threaded interior sidewall of the cylinder base which allows for upward and downward movement when the stop is rotated. The clip punch device also includes means for restricting rotational movement of the piston stop which comprises adjacent vertical slots also running on the exterior sidewall of the piston, but perpendicular to the threads on this surface. Rotational movement is prevented by means of a positive locking mechanism which may consist of a pin of appropriate dimension which interlocks with the vertical slots on the piston stop.

BRIEF DESCRIPTION OF THE DRAWINGS

For a further understanding of the invention, as well as the characterizing features, reference should now be made to the following detailed description thereof taken in conjunction with the accompanying drawings wherein:

FIG. 2 is an enlarged elevation of one of the clipping mechanisms shown in FIG. 1.

FIG. 3 is a vertical sectional view of the upper piston with the piston in a retracted position taken along line 3—3 of FIG. 5.

FIG. 4 is a similar companion view of the lower die position in retracted position.

DESCRIPTION OF PREFERRED EMBODIMENTS

Figure 1:
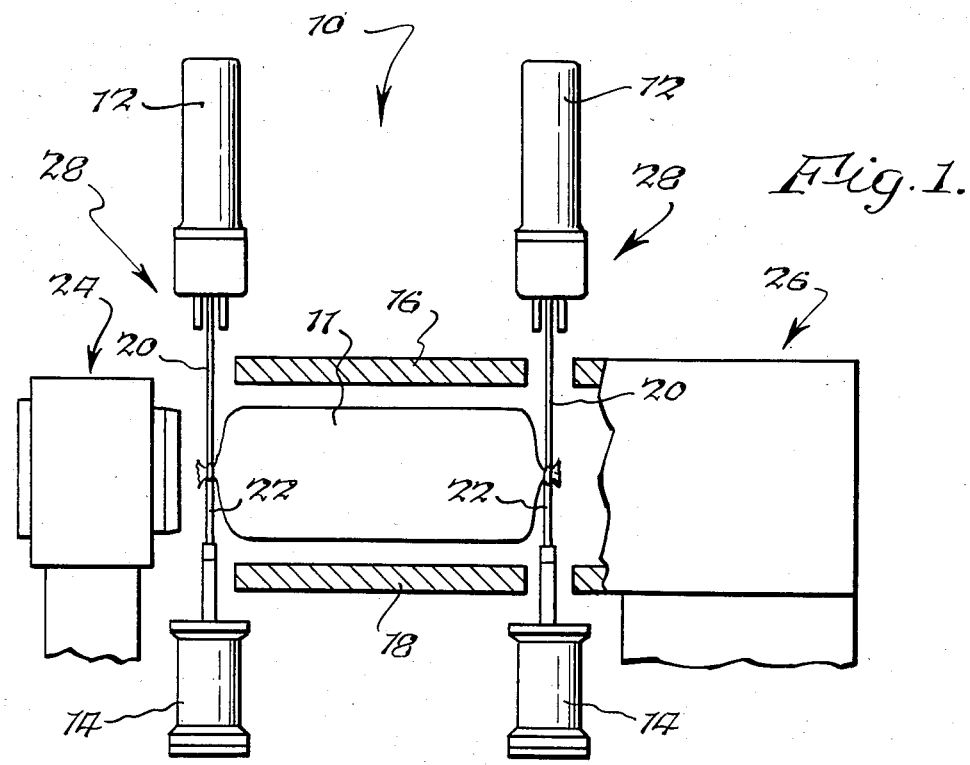
FIG. 1 is a diagrammatic view of a side elevation of a sausage filling machine with parts broken away and parts in their working position.

Turning now to FIG. 1, there is provided a partial diagram of an automatic meat stuffing device 10 with a filled sausage casing 11 in place. Typically, the meat stuffing device 10 will be comprised of a stuffing horn assembly 24 which serves as a conduit for meat emulsion being extruded into the casing. Although not fully illustrated, such meat stuffing devices may include, for instance, a continuous casing supply, guide and lock means for moving a quantity of casing to a carrier section 26 which shuttles the tubular casing on rail guides 16 and 18 to the nozzle of the stuffing assembly 24 for filling. The casing is filled and the carrier returns to its starting position. The filled casing may then be compressed, adjusted, gathered etc., and the ends banded with clips using clipping apparatus 28 to secure each end of the sausage. The clipping apparatus may also include in combination various known shutter or clamping assemblies (not shown) which gather and compress the casing material holding it tightly closed while the clip is being applied. Such clamping apparatus is illustrated, for example, in U.S. Pat. No. 3,553,768.

As will be seen from FIG. 1, each clipping apparatus 28 comprises a downward extending punch or strike rod 20 driven by a upper cylinder 12, and lower die rod 22 driven upwardly by lower cylinder 14. Clip 21 (FIG. 2) is deformed against the die 88 (FIGS. 2 and 4) positioned at the terminal edge of die rod 22 by the force provided by the cylinder and punch rod.

FIG. 3 illustrates the components of the upper cylinder of clipping apparatus 28. Upper cylinder 12 includes a cylinder base 30 mounted axially thereto. Cylinder base 30 has threads 52 in the upper region of the interior sidewall. The cylinder base also has a floor panel 64 with a central opening 61 for punch rod 20, illustrated in FIGS. 3 and 5. The floor panel of the cylinder base may also have one or more additional ports 44 which readily facilitate the discharge and intake of air during the downstroke and return of the punch rod.

Figure 5:
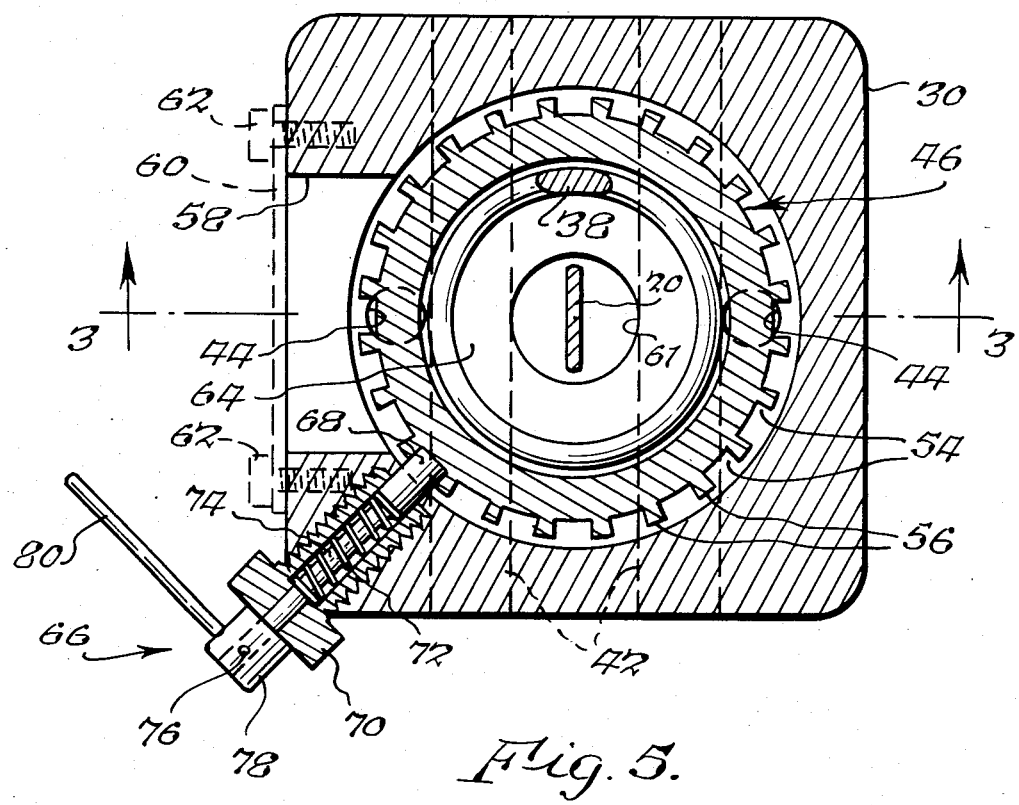
FIG. 5 is a horizontal cross-sectional view taken along 5—5 of FIG. 3.

Base 30 is also preferably equipped with an access window 58 which provides a convenient passageway for adjusting the height of piston stop 46, described in greater detail below. FIG. 5 also shows access window 58 equipped with an optional cover 60 affixed by threaded fasteners 62. The cylinder base is also equipped with dual flanges 42 for convenient mounting of the upper cylinder, for example, onto a shutter or clamping mechanism of an automatic meat stuffing machine.

The cylinder 12 is fluid actuated via line 32 which is interconnected to an air or hydraulic fluid supply (not shown). The striker rod 20 is driven by piston 34 fitted with an O-ring 36 of nitrile rubber or other appropriate material to seal the piston and minimize loss of compression when actuated. The upper portion of the striker or punch rod 20 is conveniently affixed to the piston by means of a mount 48 below piston 34. The punch rod 20 is preferably secured to mount 48 with threaded fasteners (not shown) to faciliate installation of replacement rods or rods of alternative dimension as dictated by the requirements of the type of clip being installed.

The underside of piston 34 may also have a rounded slot 40 for seating retraction spring 38 for return of the piston. The use of spring 38, which is preferred, would be employed in those cases where, for instance, a vacuum is not pulled off of line 32 in retracting piston 34. Spring 38 is shown running the entire length of the cylinder and cylinder base and is seated on the cylinder base floor or endwall 64. As best shown in FIG. 5, the width of spring 38 should allow for free and unobstructed passage through the central opening of piston stop 46 during both compression and return phases of the piston 34.

The piston stop 46 comprises a hollow, cylindrical or tubular shaped collar which fits in the interior of the cylinder and cylinder base and operates to limit the length of stroke of the piston and punch rod. By adjusting the height of piston stop 46 the punch will be less likely to overform or underform clips in the clip deforming process by making contact with head 57 of the stop. A portion of the exterior sidewall of the piston stop has threads 50 which mate with threads 52 of the cylinder base. The sidewall adjacent to the threaded exterior portion of the piston stop also has a multiplicity of parallel vertical slots or grooves 54 running with the longitudinal axis of the upper cylinder and perpendicular to threads 50. As illustrated in FIG. 5, slots 54 circumscribe the exterior sidewall of the stop and are spaced by ridges 56. The width and depth of the individual slots should be sufficient to receive and securely seat pin 68 of locking mechanism 66. Ridges 56 also provide a convenient means for leveraging an instrument in order to rotate the piston stop and make adjustments thereto via access window 58.

The piston stop 46 is shown in FIG. 3 with the vertical parallel slots 54 in the lower region of the exterior sidewall and with the threaded surface 50 in the upper region of the piston stop sidewall. The present invention also contemplates an embodiment wherein the vertical slots are positioned at the upper end of the stop and the threaded surface in the lower region of said stop. In addition, only the interior sidewall of the cylinder base is shown to be tapped. Accordingly, the interior sidewall of the upper cylinder 12 may be threaded as well. In the latter case, the vertical slotted portion of the piston stop may be locked and adjusted in the region of the cylinder base.

FIG. 5 illustrates the interaction of locking mechanism 66 with slots 54 which positively lock the piston stop at the desired height without slippage by preventing rotational movements. Pin 68 is shown securely seated between ridges 56 of said slots and is retained in locking position through compression spring 72 threaded over narrowed shaft 74 all of which fits inside hollow threaded mount 70. Locking mechanism 66 is threaded through the sidewall of the cylinder base by means of mount 70. The narrowed shaft 74 may exceed the length of the mount 70 and be secured to a fitting 78 by means of a pin 76 or with a "spotweld", brazed etc. Thus, locking mechanism 66 may be disengaged by sufficient retracting force on handle 80 to offset the opposing pressure of spring 72 thereby removing the pin from vertical slot 54. While the locking pin 68 is in a retracted position the machine operator may by lifting cover 60 have access to the piston stop rotating it either to the right or left as required. This action raises or lowers the piston stop to adjust the length of the down stroke of the piston. When the adjustment has been completed the handle of the locking mechanism 66 is released to allow reseating of pin 68 inside slot 54. This action positively locks the stop such that even with repeated down strokes on the head 57 of the piston stop the need to reset the stop due to vibration etc., is not required.

As previously indicated, when the fluid actuated clip punch is used in connection with banding stuffed food casings the device is usually employed in combination with a die positioned below the striker rod against which the clip is deformed. FIG. 4 illustrates lower cylinder 14 which is a fluid actuated type die wherein die 88 at the head of die rod 22 is actuated upwardly to meet the downward stroke of punch rod 20. It is to be understood, however, that for purposes of this invention the concepts contemplated herein are not limited to fluid actuated dies, but includes dies which are stationary, or substantially stationary, and do not require overt movements to achieve the results desired.

FIG. 4 shows a fluid cylinder in a retracted position which is actuated by fluid line 98 driving piston 90 in an upward position. The piston of the lower cylinder is also equipped with an O-ring 102 to seal and maximize compression and minimize loss of air or fluid between the interior sidewall of the cylinder and exterior wall of the piston. Extending upwardly from the piston is a rod 92 sealed with an upper O-ring seal 94 of conventional design. Die rod 22 with die 88 is a continuation of piston rod 92. The body of lower cylinder 14 is also equipped with a narrowed upper shoulder 96 which performs as a stop for the lower piston 90. Similarly to the upper cylinder 12, the lower cylinder 14 is preferably fitted with one or more ports 100 to allow discharge and entry of air during compression and return of the piston.

Having described in detail the improved clip punch device, operation thereof is best illustrated by reference to FIG. 2 wherein a filled casing 11 with its terminal edge 84 is now in position for banding. Clips are supplied by a magazine (not shown) of conventional design, such as described in U.S. Pat. Nos. 3,237,290 and 3,553,768. Actuation of both the upper cylinder 12 of the clip punch device and lower cylinder 14 from a compressed air source via line 32 and 98 produces a downward compression of piston 34 and punch rod 20 and upward compression of piston 90, piston rod 92 and die rod 22. U-shaped clip 21 is compressed against the die deforming the legs of the clip so they cross over. However, the length of the downward stroke is restricted by piston stop 46 so the legs of the clip are crimped, but not overformed or driven upwardly to puncture or tear the casing material. To make the fine adjustments in the length of the stroke the piston stop may be tapped to provide threads, for example, of 2.5 mm between the peaks of each thread. The parallel slots are milled to be between about 6 and 7 millimeters wide to provide 24 equally spaced slots so that rotational movement of the stop provides an upward or downward displacement of the punch rod and piston of about 0.004 inches.

As previously indicated, the clip punch device disclosed herein is especially adaptable for use in combination with various automatic meat stuffing devices, such as manufactured by the Futaba Corporation and available under the FUT trademark, including such equipment known as the Futaba model 70X Automatic Meat Stuffer available from Teepak, Inc., Inc., Danville, Ill. The clip punch, however, is adaptable to virtually any meat stuffing devices which require banding of stuffed meat products.

Although the invention has been described in considerable detail with respect to the preferred embodiments thereof, it will be apparent that the invention is capable of numerous modifications and variations to those skilled in the art without departing from the spirit and scope of the invention, as defined in the claims.

What is claimed is:

1. A fluid actuated punch device comprising:
(a) a cylinder,
(b) a cylinder base mounted to the cylinder, said cylinder base having an interior threaded sidewall and an endwall defining a central opening,
(c) a piston for traversing the cylinder,
(d) a punch rod longitudinally extending through said cylinder and cylinder base and affixed to the piston, and
(e) a piston stop enclosed in said cylinder base, said stop comprising a cylindrical-shaped tubular body having interior and exterior surfaces and a central opening for said punch rod, at least a portion of the exterior surface of said stop being threaded for engaging with the interior threaded sidewall of the cylinder base for longitudinal movement when rotated, said device including means for restricting rotational movement of the piston stop.

2. The punch device of claim 1 including a die positioned below the punch rod against which a clip is deformed.

3. The punch device of claim 2 wherein the piston stop includes slots on the exterior surface.

4. The punch of claim 3 wherein the slots on the stop are parallel and run perpendicular to the threads on said stop.

5. The punch of claim 4 wherein rotational movement of the stop is restricted by locking means engaging with the parallel slots.

6. The punch of claim 5 including access means to the piston stop for making rotational adjustments to said stop.

7. The punch of claim 6 wherein the piston stop locking means comprises a pin interlocking with a parallel slot.

8. The punch of claim 1 including piston retraction means.

9. The punch of claim 8 wherein the cylinder is a pneumatic cylinder.

10. The punch of claim 2 in combination with a meat stuffing machine.

11. The punch device of claim 7 in combination with a meat stuffing machine.

12. A clip punch device including a fluid actuated punch in combination with a cooperating die member longitudinally aligned with said punch against which a clip is deformed, said fluid actuated punch comprising:

(a) a cylinder,
(b) a cylinder base mounted to the cylinder, said cylinder base having a sidewall and an endwall defining a central opening, the interior surface of the cylinder base sidewall or cylinder being threaded,
(c) a piston for traversing the cylinder,
(d) a punch rod affixed to the piston and longitudinally extending through said cylinder and cylinder base for compressing and deforming clips against said die member,
(e) a piston stop enclosed in said cylinder base or cylinder, said stop comprising a cylindrical-shaped tubular body having interior and exterior surfaces and a central opening for the punch rod, the exterior surface of said stop having parallel slots, and threads for engaging with the threaded sidewall of the cylinder or cylinder base for longitudinal movement of the stop when rotated, and
(f) means cooperating with said slots for restricting rotational movement of said piston stop.

13. A fluid actuated punch device comprising:
(a) a fluid cylinder having an interior threaded sidewall,
(b) a piston for traversing the cylinder,
(c) a punch rod longitudinally extending through said cylinder and affixed to the piston,
(d) means for retracting said piston,
(e) a piston stop comprising a cylindrical-shaped tubular body having interior and exterior sidewalls and a central opening for the punch rod extending through the fluid cylinder, the exterior sidewall having slots and threads engaging with the interior threaded sidewall of the fluid cylinder, the stop including the slotted portion being dimensionally sufficient to fit in the interior of said fluid cylinder,
(f) means cooperating with the slots for restricting rotational movement of said stop, and
(g) access means to the piston stop through the sidewall of the fluid cylinder for making rotional adjustments to the stop.

14. The punch device of claim 13 including a die positioned below the punch rod against which a clip is deformed.

15. The punch device of claim 14 wherein the slots on the exterior surface are parallel and run perpendicular to the threads on the stop.

16. The punch device of claim 15 wherein the means restricting rotational movement of the stop comprises a pin engaging with a parallel slot.

17. The punch device of claim 14 in combination with a sausage stuffing machine.

* * * * *